United States Patent [19]
Koyama et al.

[11] Patent Number: 5,621,194
[45] Date of Patent: Apr. 15, 1997

[54] COMBINATIONAL WEIGHING MAHINE WITH WASHING DEVICE

[75] Inventors: Nobuo Koyama; Masaaki Iwamoto, both of Osaka, Japan

[73] Assignee: Ishida Co., Ltd., Kyoto, Japan

[21] Appl. No.: 205,984

[22] Filed: Mar. 4, 1994

[30] Foreign Application Priority Data

Mar. 8, 1993 [JP] Japan ................................. 5-075299

[51] Int. Cl.⁶ .......................... G01G 13/00; G01G 19/00; B08B 3/04
[52] U.S. Cl. ................... 177/25.18; 177/245; 134/104.1; 134/104.2; 134/177; 134/199
[58] Field of Search ............................. 134/104.1, 104.3, 134/177, 199; 222/148; 177/25.18, 245

[56] References Cited

U.S. PATENT DOCUMENTS

| | | | |
|---|---|---|---|
| 4,437,527 | 3/1984 | Omae et al. | 177/25.18 |
| 4,537,229 | 8/1985 | Sashiki et al. | 177/25.18 |
| 4,547,339 | 10/1985 | McClure | 222/148 X |
| 4,812,701 | 3/1989 | Izumi | 312/285 |
| 4,977,968 | 12/1990 | Krämer | 177/245 |
| 5,186,240 | 2/1993 | Kennon et al. | 134/199 X |

Primary Examiner—Michael L. Gellner
Assistant Examiner—Randy W. Gibson
Attorney, Agent, or Firm—Majestic, Parsons, Siebert & Hsue

[57] ABSTRACT

A combinational weighing machine has weigh hoppers for weighing articles, a dispersion feeder for dispersing articles to be weighed, supply troughs for supplying articles from the dispersion feeder to the weigh hoppers and a control unit for controlling overall operations of the machine inclusive of combining weight values outputted from the weigh hoppers and discharging articles from selected ones of these weigh hoppers. The weighing machine is placed inside a washing device which forms a closed chamber inside and covers the weighing machine from all its four sides as well as from above. Nozzles for emitting warm water and a cleaning liquid are provided inside this chamber such that the liquids are prevented from splashing the work areas around the machine. The washing device may be lifted and kept away from the weighing machine during a normal mode of operation of the latter.

18 Claims, 9 Drawing Sheets

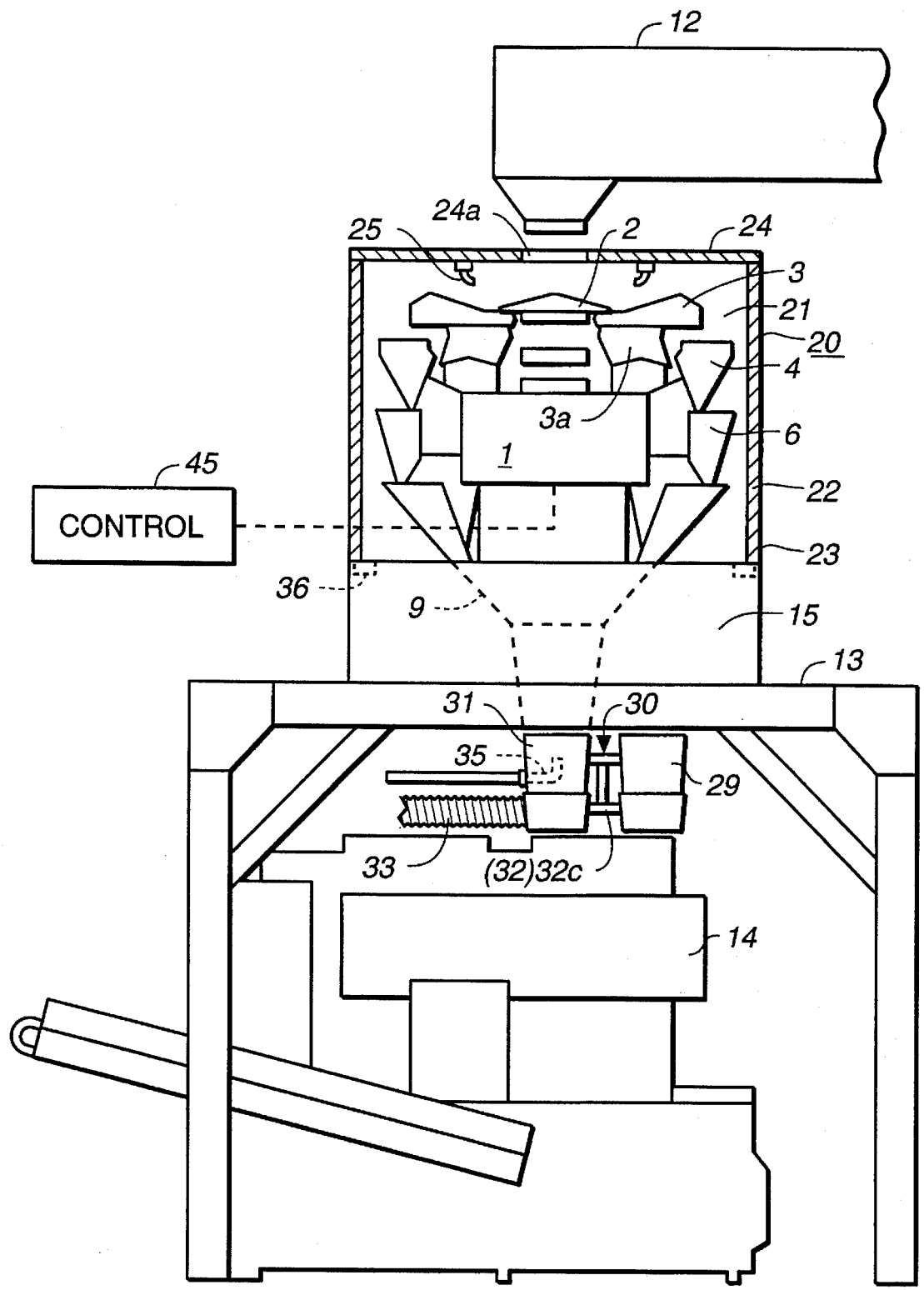
FIG._1

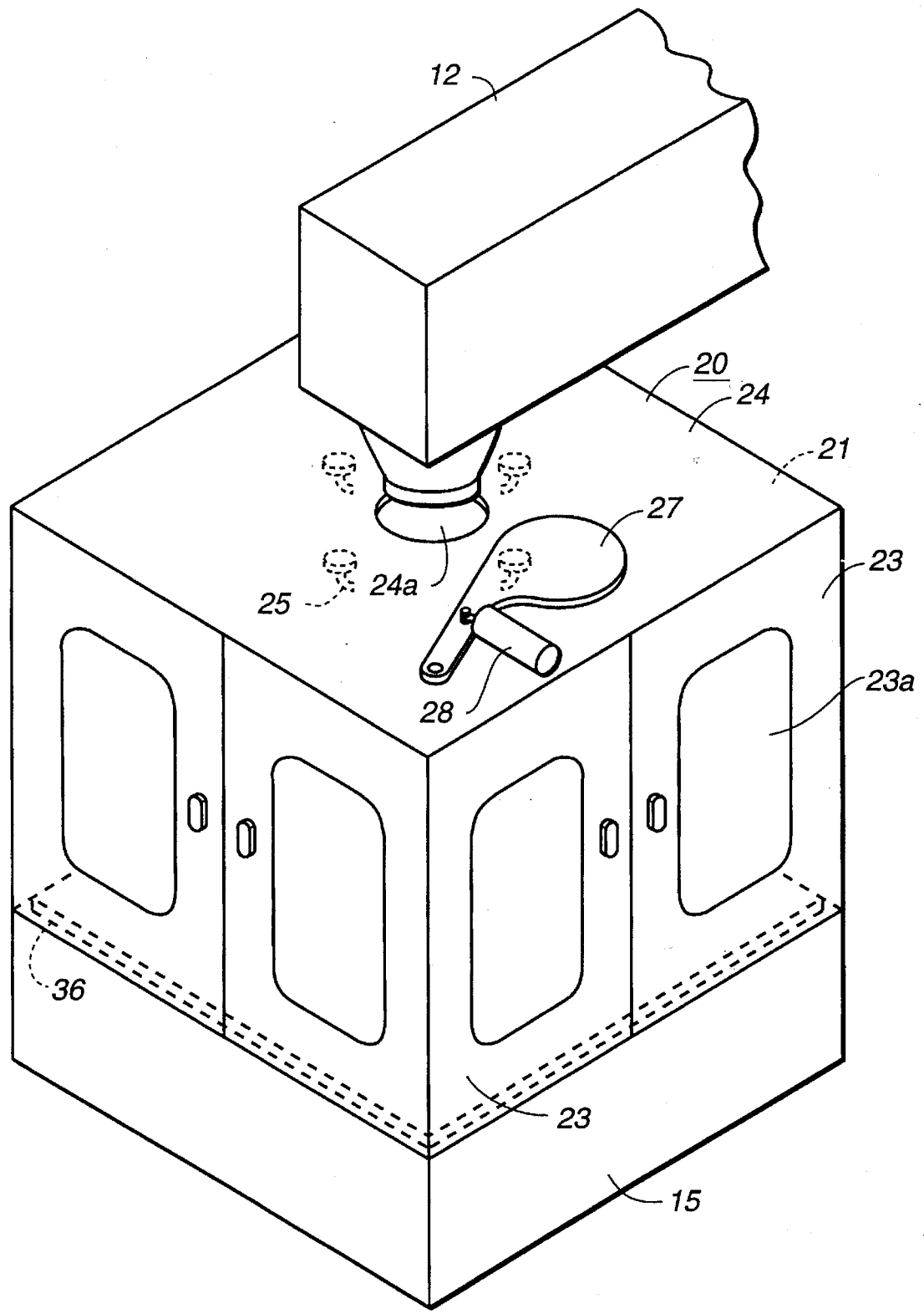
FIG._2

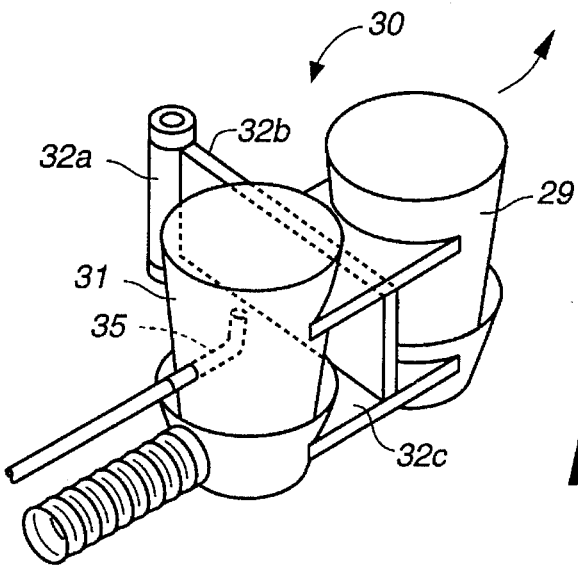
FIG._3
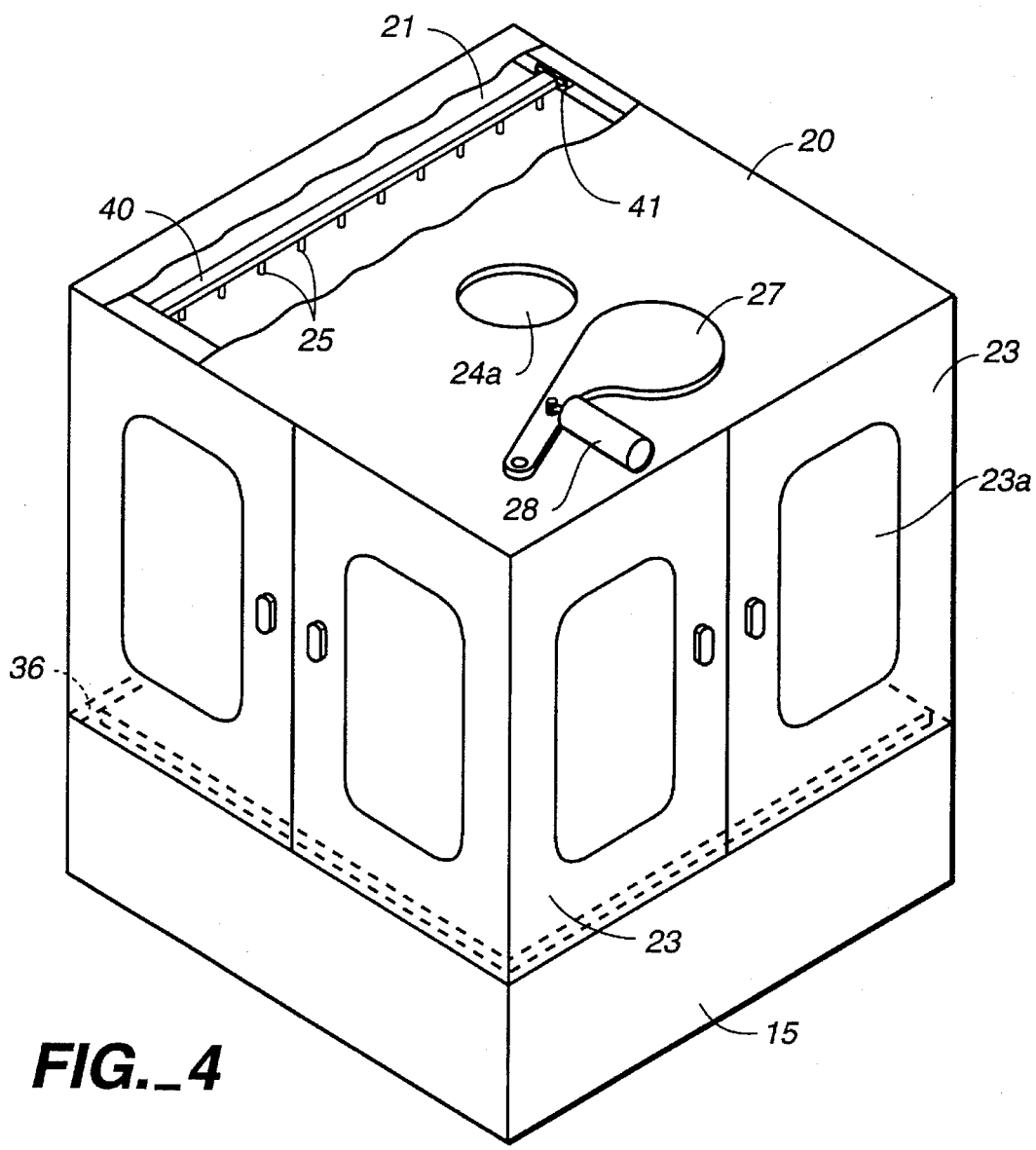
FIG._4

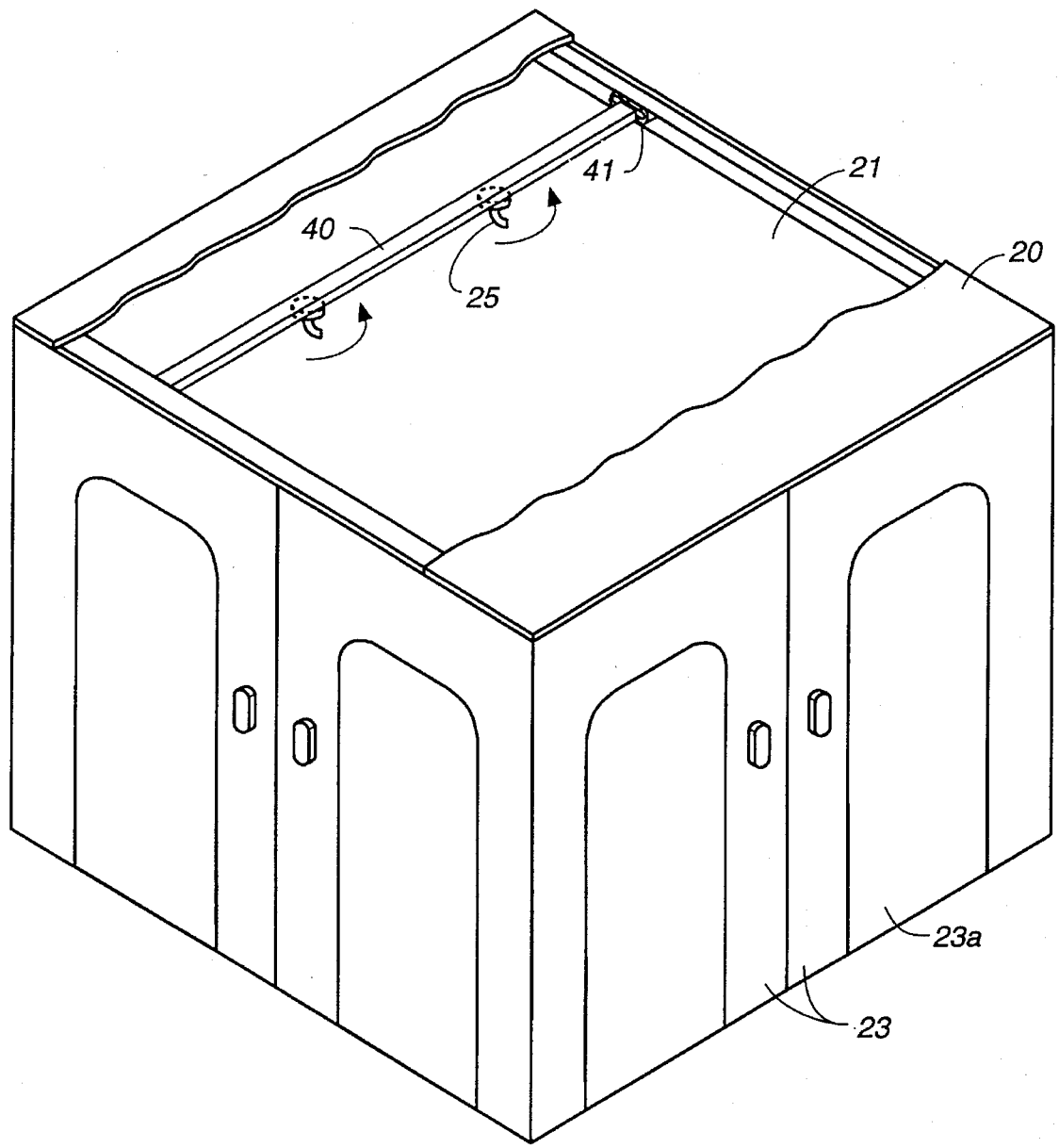
FIG._5

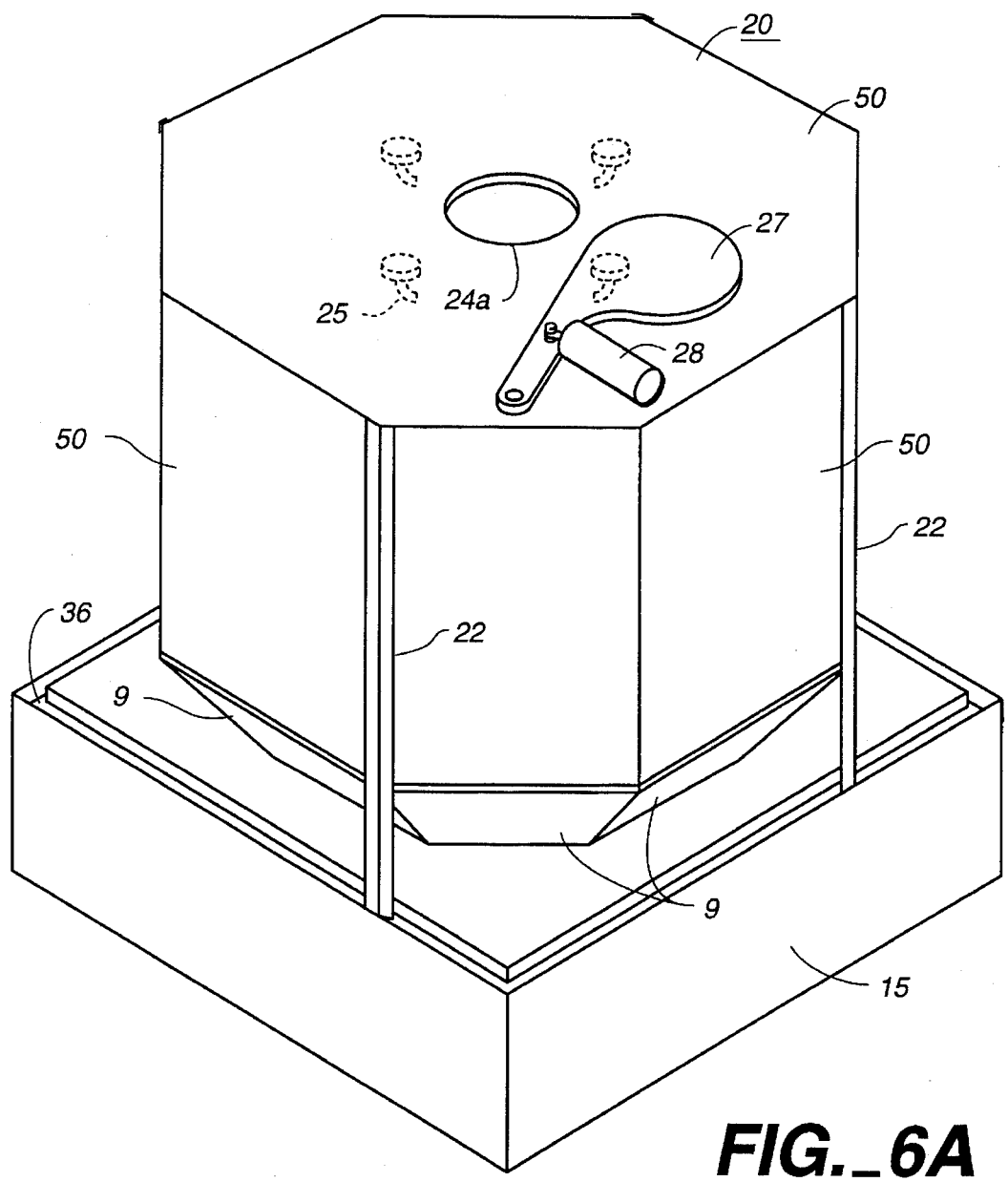
FIG._6A
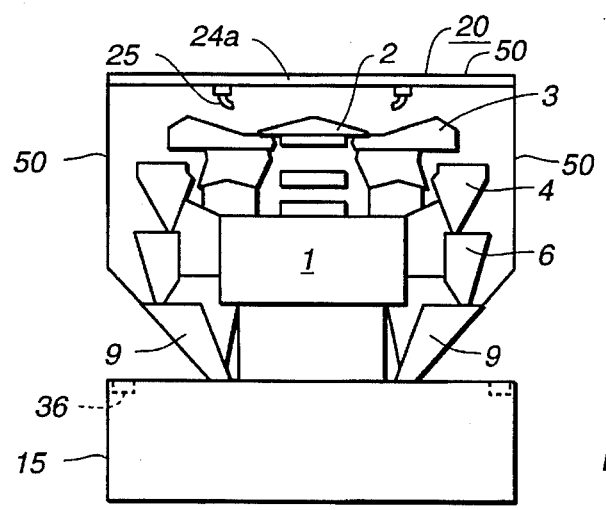
FIG._6B

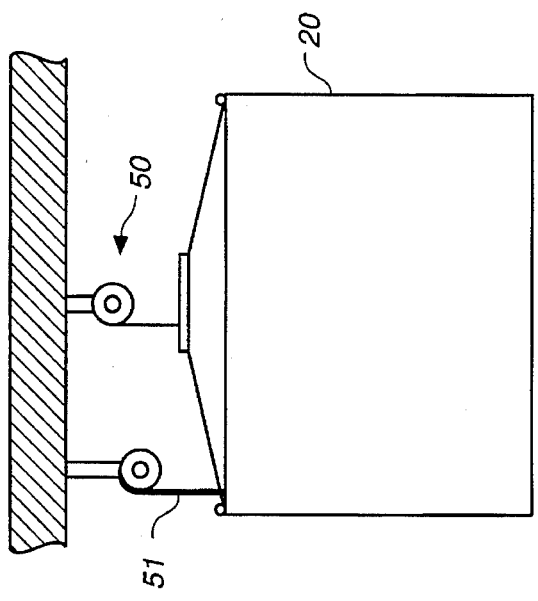
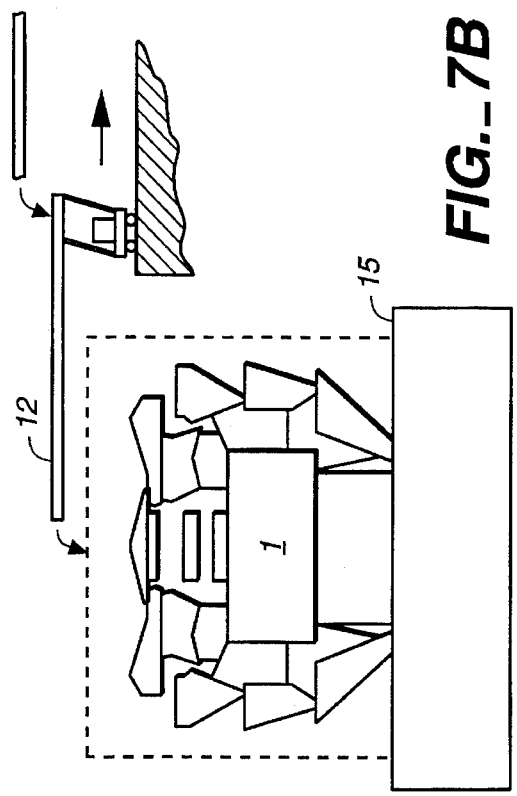
FIG._7B
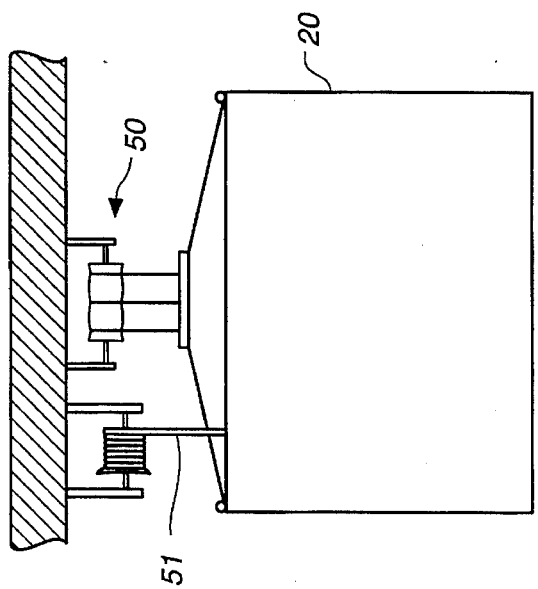
FIG._7A

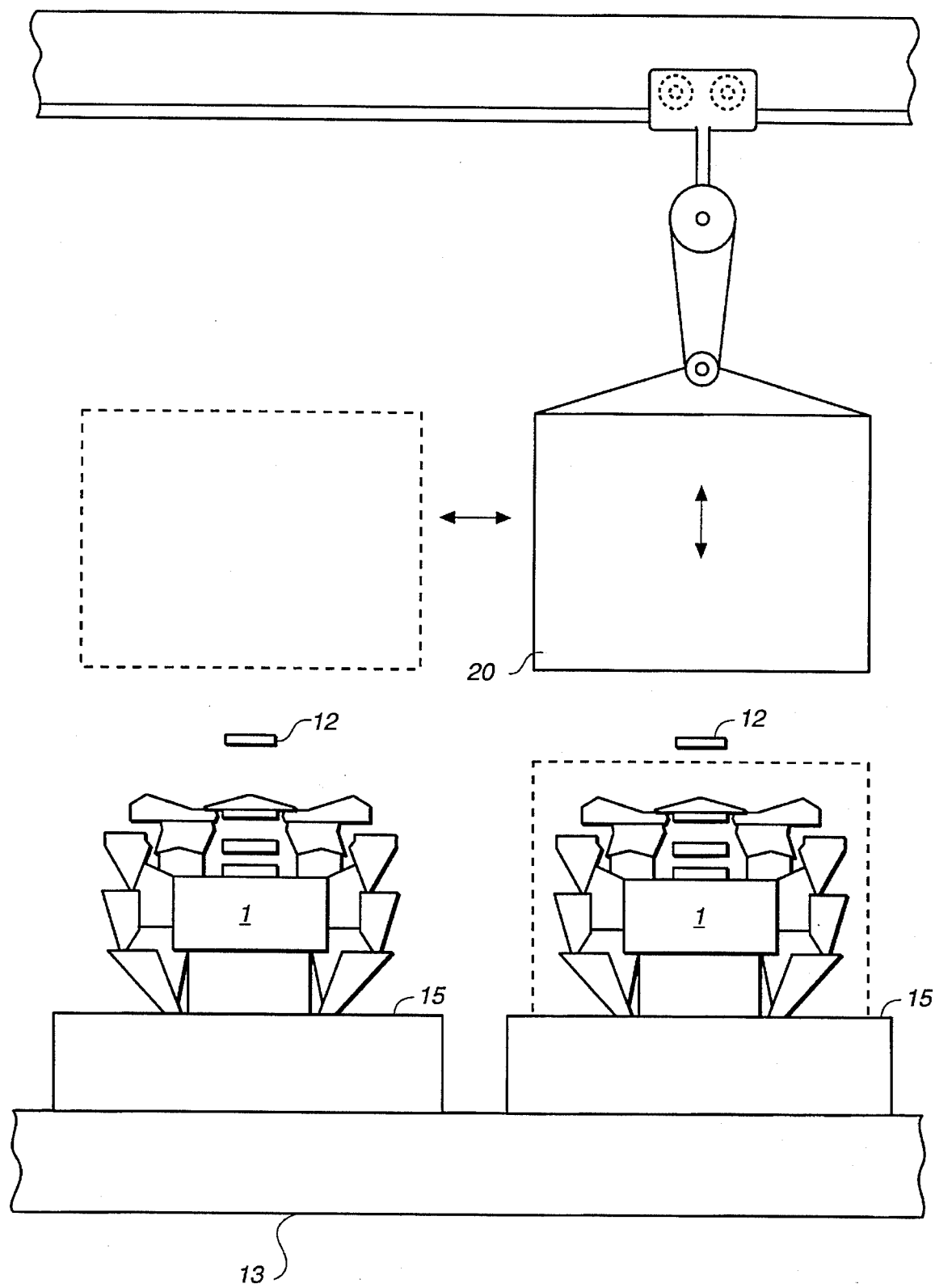
FIG._8

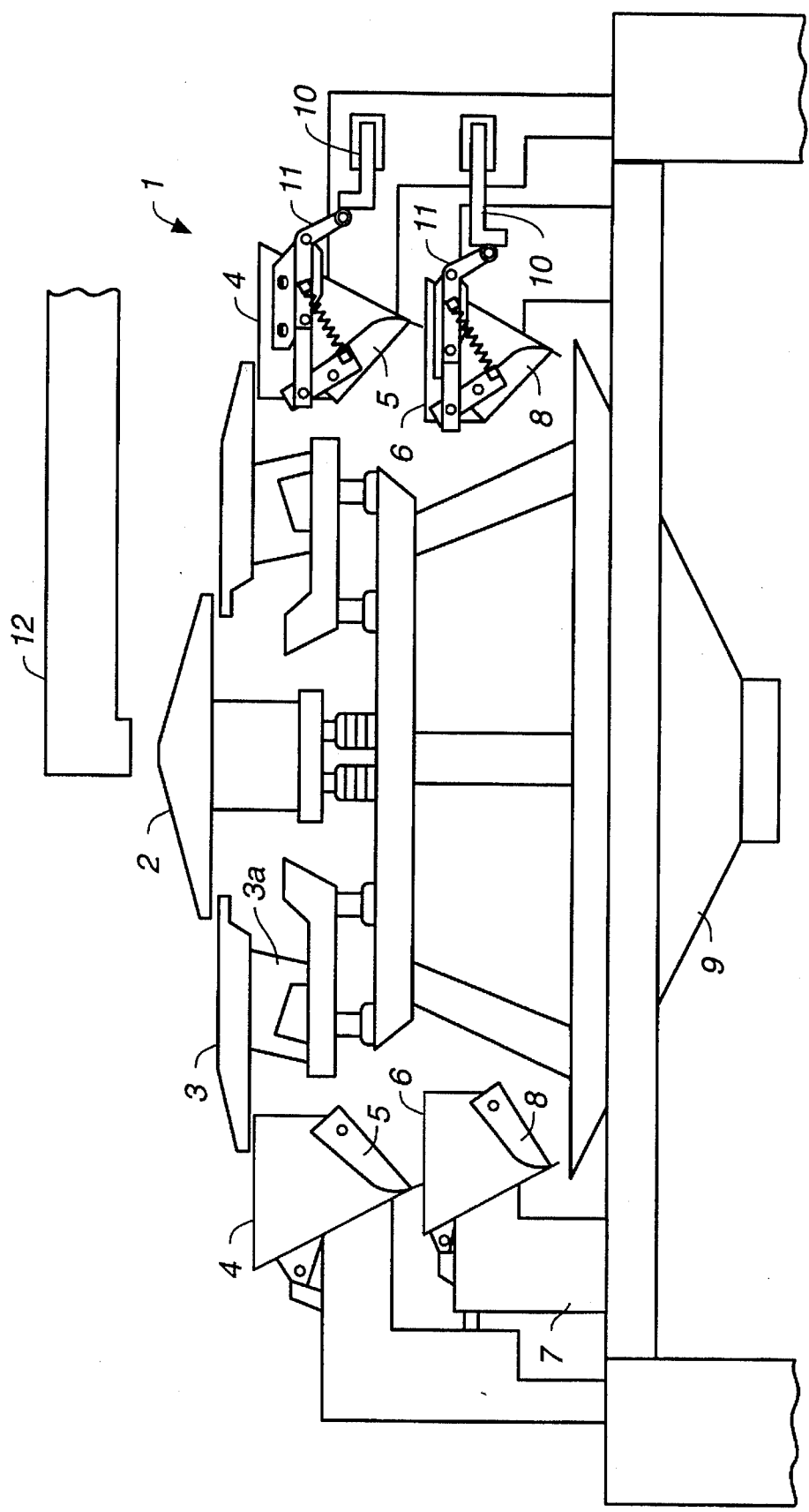
FIG._9 (PRIOR ART)

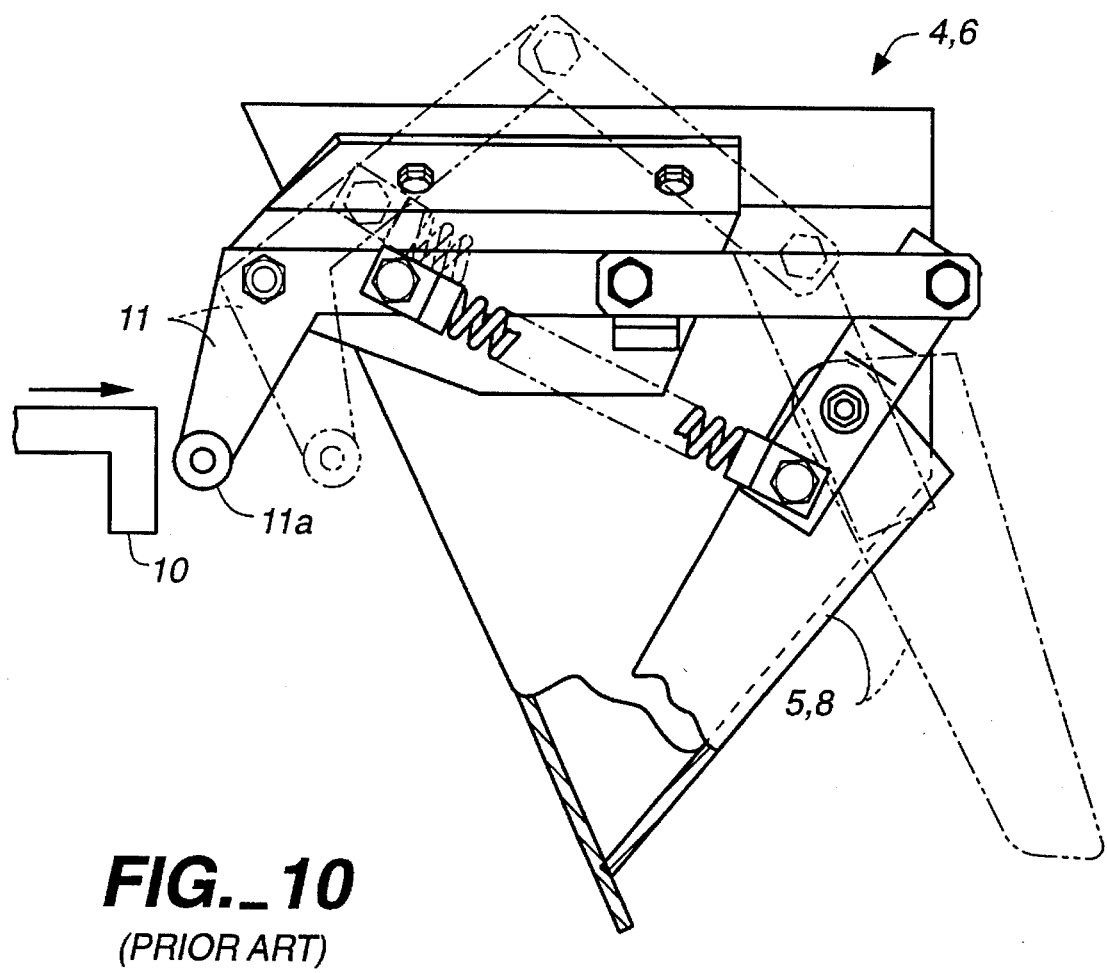
FIG._10
(PRIOR ART)

COMBINATIONAL WEIGHING MAHINE WITH WASHING DEVICE

BACKGROUND OF THE INVENTION

This invention relates in particular to a device for washing a combinational weighing machine of a kind with a plurality of article-supplying troughs and weigh hoppers. More broadly, the invention relates to combinational weighing machines equipped with such a washing device.

As disclosed in Japanese Patent Publication Tokkai 63-30725, for example, combinational weighing machines are used for the purpose of gathering several pieces of articles with individually fluctuating weights such as candies, fruits and vegetables such that their total weight will be equal to, or very close to a specified target weight. FIG. 9 shows an example of such a combinational weighing machine, indicated generally by numeral 1 and having a conveyor 12 for dropping articles to be weighed to the center of a dispersion feeder 2. A plural number of supply troughs 3 are arranged around the periphery of the dispersion feeder 2. Each supply trough 3 can be vibrated by a vibrator 3a associated with it so as to deliver the articles received from the dispersion feeder 2 at one of its ends to corresponding one of pool hoppers 4 at the other of its ends. Each pool hopper 4 is provided with a gate 5 and has a weigh hopper 6 associated with it situated below it. Each weigh hopper 6 is provided with a weighing device 7 and a gate 8, and there is a collector chute 9 below the gates 8 of the weigh hoppers 6. Weight values of articles outputted from the weigh hoppers 6 are variously combined to determine a particular combination such that the sum of its weight values is equal to, or satisfactorily close to a predetermined target weight. As shown in FIG. 10, each gate 5 or 8 of the hopper 4 or 6 is adapted to be opened and closed by means of a pushing member 10 which moves backward and forward and thereby serves to push one end 11a of a linking mechanism 11 for the gate 5 or 8.

The inner surfaces of the supply troughs 3 and the hoppers 4 and 6 of the weighing machine 1, as shown in FIG. 9, must be cleaned whenever vegetables, for example, of a different kind are going to be weighed because they are where the articles to be weighed come into contact. It has been a customary routine, therefore, to remove the supply troughs 3 and the hoppers 4 and 6 from the weighing machine 1 and transport them to a separately provided washing device to have them cleaned therein. Since most combinational weighing machines use many supply troughs and hoppers, it is a cumbersome process to remove them and install them again.

In view of the above, Japanese Patent Publication Tokkai 2-161324, for example, disclosed a cleaning device which does not require the troughs or the hoppers to be removed from the weighing machine but washes them while they remain installed. According to this prior art technology, use is made of a rotary arm adapted to move around the weighing machine and a cleaning liquid and/or warm water is emitted from a nozzle on this rotary arm. As a result, the emitted liquids are scattered around, adversely affecting the sanitary conditions of the near-by working areas as well as the packaging machine which is likely to be set beneath the weighing machine.

SUMMARY OF THE INVENTION

It is therefore an object of the invention to provide a washing device for washing a combinational weighing machine as a whole which is capable of preventing cleaning liquids from scattering around.

It is another object of the invention to provide a combinational weighing machine provided with such a washing device.

A combinational weighing machine according to the present invention, with which the above and other objects can be accomplished, may be characterized as having its four sides and top covered so as to form a washing chamber therearound and providing nozzles inside this washing chamber for emitting warm water and a cleaning liquid. According to a preferred embodiment of the invention, an opening is provided at the top of this washing chamber for allowing articles to be weighed to pass therethrough. Underneath the chute for collecting the weighed articles dropped from the hoppers of the weighing machine, there are provided horizontally mobile receivers, one for receiving the liquid used for the washing and the other for receiving the articles dropped into the chute. Another nozzle for emitting steam is preferably provided such that the emitted steam will pass through the chute and enter the washing chamber. With a washing chamber thus provided, the combinational weigher can be washed without causing the cleaning liquid to scatter all over to adversely affect the sanitary condition of the work space around the machine.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic side sectional view of a combinational weighing machine and a packaging machine provided with a washing device according to a first embodiment of the invention;

FIG. 2 is a perspective view of a portion of the washing device of FIG. 1;

FIG. 3 is a schematic perspective view of the liquid-discharging portion of the washing device of FIGS. 1 and 2;

FIG. 4 is a partially broken schematic perspective view of another washing device according to a second embodiment of the invention;

FIG. 5 is a partially broken schematic perspective view of still another washing device according to a third embodiment of the invention;

FIG. 6A is a schematic perspective view of a portion of still another washing device according to a fourth embodiment of the invention, and FIG. 6B is its schematic horizontal sectional view;

FIG. 7A is a schematic front view of a washing device of the invention supported from a ceiling and FIG. 7 Bis its schematic side view with a combinational weighing machine from which it has been lifted;

FIG. 8 is a schematic side view of a washing device of the invention adapted to be used successively with a plurality of combinational weighing machines arranged in a row;

FIG. 9 is a schematic side view of a prior art combinational weighing machine; and FIG. 10 is a schematic side view of a hopper of the combinational weighing machine shown in FIG. 9.

In all these figures, components which are substantially the same or at least equivalent to each other are indicated by the same numerals and are not described in detail each time they appear in the specification.

Detailed Description of the Invention

A combinational weighing machine according to a first embodiment of the invention is described with reference to FIGS. 1, 2 and 3. It is indicated generally by numeral 1 in FIG. 1 and is shown as being set up on a base 15 on top of a frame 13 and above a packaging machine 14.

According to this embodiment, a washing device 20 is set up on the base 15 for the weighing machine 1, forming a washing chamber 21 by covering the four sides and the top of the weighing machine 1. For this purpose, the washing device 20 comprises four support columns 22 erected on the base 15, doors 23 which can be opened and closed and are attached to these columns 22 as shown in FIG. 2, and a ceiling plate 24 at the top. The doors 23 are provided with windows, or peep holes 23a.

The ceiling plate 24 at the top of the washing chamber 21 is provided with an opening 24a for allowing articles to be weighed to pass through. This opening 24a is positioned directly above the dispersion feeder 2 shown in FIG. 1 and can be closed by means of a screening plate 27 disposed above and rotatably supported by the ceiling plate 24. Numeral 28 indicates an air cylinder for moving the screening plate 27 to open or close the opening 24a.

A plurality of nozzles 25 for washing are at elevated positions inside the washing chamber 21. These nozzles 25 are connected through a piping system with valves to tanks for a cleaning liquid and warm water (not shown) and are adapted to emit the cleaning liquid and warm water alternately to the dispersion feeder 2, the supply troughs 3 and the hoppers 4 and 6 shown in FIG. 1 while rotating by the pressure of the liquid being emitted according to a known mechanism. It is preferable to use a foamed cleaning liquid. Below the washing chamber 21 is a discharge unit 30 for discharging used liquid. A gutter 36 is formed on the base 15 of the weighing machine 1 in the form of a groove all around it and is connected either to a discharge pipe (not shown) or the collector chute 9. Below the chute 9, an article receiver 29 and a liquid receiver 31 are supported by a supporting structure 32 so as to be transportable horizontally. When the weighing machine 1 is in the operation mode wherein combinational weighing is carried out, the article receiver 29 is moved to the left from the position shown in FIG. 1 and serves to guide the articles sliding down the chute 9 into the packaging machine 14 disposed below. When the weighing machine is operating in the washing mode, on the other hand, the receivers 29 and 31 are at the positions shown in FIG. 1 such that the cleaning liquid and warm water which have been used for the washing and collected from the chute 9 are received by the liquid receiver 31 and discharged into an expandable discharge pipe 33.

As shown in FIG. 3, the supporting structure 32 includes a tubular member 32a which engages rotatably with a supporting member (not shown) protruding upward from the main structure of the packaging machine 14. A horizontally extending arm 32a is connected to this tubular member 32a and supports the aforementioned receivers 29 and 31 through a stay 32c. Thus, an operator has only to rotate the receivers 29 and 31 by a small angle around the tubular member 32a in order to bring either of the receivers 29 and 31 to a position directly under the bottom opening of the chute 9 as shown in FIG. 1. A steam nozzle 35 opens inside the liquid receiver 31, entering it from a side. The steam nozzle 35 is for emitting steam therefrom such that the emitted steam is led through the chute 9 into the washing chamber 21.

Although shown only schematically in FIG. 1, the combinational weighing machine 1 includes a control unit 45 adapted to control the movement of the pushing member 10 shown in FIG. 10 so as to selectively close the corresponding hopper gate 5 or 8 completely as shown by solid lines, open it completely as shown by broken lines or set it at a half-way position therebetween (or the semi-open position). The control unit is also adapted to control the vibrators 3a shown in FIG. 1 to vibrate the supply troughs 3. It is also to be understood that all driving parts of the weighing machine 1 are of a water-proof structure.

The washing mode of operation consists of a cycle of processes including pre-washing, application of a cleaning liquid, waiting, rinsing, sterilizing and drying. When it becomes necessary to wash the weighing machine 1, the operator rotates the receivers 29 and 31 by a small angle to position the liquid receiver 31 directly below the bottom opening of the chute 9 as shown in FIG. 1. Next, the control unit 45 not only sets the hopper gates 5 and 8 at the semi-open positions as explained above, but also drives the air cylinder 28 shown in FIG. 2 to close the opening 24a with the screening plate 27. Thereafter, warm water is emitted from the nozzles 25 to pre-wash the dispersion feeder 2, the supply troughs 3 and the hoppers 4 and 6. Next, the valves (not shown in the figures) are switched to scatter a foamed cleaning liquid through the same nozzles 25. The foamed cleaning liquid not only becomes directly attached to the dispersion feeder 2, the supply troughs 3 and the inner surfaces of the hoppers 4 and 6, but also gradually flows downwards to cover the inner surfaces of the hoppers 4 and 6 and the chute 9. After the cleaning liquid has sufficiently covered the surfaces to be cleaned, the application of the liquid is stopped and the system is left in this condition for a specified length of time. During this waiting period, the inner surfaces of the hoppers 4 and 6, etc. are cleaned by the surface active effect of the cleaning liquid.

After the waiting period, warm water is spread again from the nozzles 25. The cleaning liquid is thereby washed off the surfaces being cleaned and discharged through the chute 9 and the liquid receiver 31 into the discharge pipe 33, or through the gutter 26. After this rinsing process is completed, steam is emitted from the steam nozzle 35. The emitted steam passes through the chute 9 and fills the washing chamber 21. Sterilization is thus effected by maintaining the interior of the washing chamber 21 at a specified high temperature for a specified length of time. After the sterilization process, a ventilating fan (not shown) is activated to pass warm air into the washing chamber 21 to dry the hoppers 4 and 6, etc. If the air cylinder 28 is activated to remove the screening plate 27 from the opening 24a, the drying process can be carried out more effectively. After the drying process, the operator will rotate the receivers 29 and 31 again to set the article receiver 29 under the bottom opening of the chute 9 to thereby set the weighing machine 1 ready for the normal mode of operation.

In summary, because the washing device 20 according to this invention provides covers for the weighing machine 1 from all four sides as well as from the top, the warm water and the cleaning liquid are prevented from scattering around down to or to the surrounding work areas. Accordingly, the frame 13 and the packaging machine 14 do not become dirty, and the environmental sanitary conditions are improved. 2Moreover, the screening plate 27 shown in FIG. 2 serves to close the top opening 24a of the washing chamber 21 such that the steam can be prevented from escaping during the sterilization process and the interior of the washing chamber 21 can be more effectively maintained at a high temperature.

Since steam is introduced from below the chute 9, furthermore, a portion of the introduced steam passes through the weigh hoppers 6 and the pool hoppers 4 to move upward. Thus, high-temperature steam is allowed to come into contact with the inner surfaces of the chute 9 and the hoppers 4 and 6 which require sterilization, In other words, the sterilization effect can be improved and the overall time required for the washing mode of operation can be diminished. As a result, the overall work efficiency of the combinational weighing machine 1 itself can be significantly improved.

Additional merits of the present invention includes the control of the hopper gate positions and the ability to vibrate the dispersion feeder 2 and the troughs 3. Because the hoppers 4 and 6 are washed with their gates 5 and 8 in the semi-open positions, the cleaning liquid can be easily and effectively introduced to their inner surfaces, and the vibrations of the dispersion feeder 2 and the troughs 3 during the washing mode of operation improve the efficiency of their washing. The control unit 45 may also be programmed to open and close the hopper gates 5 and 8 a few times for removing liquid drops from the surfaces thereof and thereby accelerating their drying process.

According to the embodiment disclosed above, the article and liquid receivers 29 and 31 are unitized such that their positions can be changed as the mode of operation is switched between the normal operation mode and the washing mode. Alternatively, however, the article receiver 29 and the liquid receiver 31 may be supported separately and individually. As a further embodiment, on the other hand, an actuator may be connected to the tubular member 32a shown in FIG. 3 such that the article receiver 29 and the liquid receiver 31 will be automatically placed under the bottom opening of the chute 9 respectively when the normal mode of operation or the washing mode of operation is selected.

In what follows, additional embodiments of the invention will be described with reference to corresponding figures, in which components that may be identical or at least substantially equivalent to each other are indicated by the same numerals for convenience and will not be explained again.

FIG. 4 shows another washing device 20 according to a second embodiment of the invention, characterized as having a horizontally extending nozzle-supporting pipe 40 supporting a plurality of nozzles 25 in a row at elevated positions. A driving mechanism 41 is provided at each end of this pipe 40 such that the pipe 40 can be moved horizontally. A rubber hose (not shown) is connected to the interior of the pipe 40 such that a cleaning liquid or warm water can be introduced to the nozzles 25 from the rubber hose through the nozzle supporting pipe 40. The nozzles 25 may be of a type adapted to emit liquid drops in a cone.

FIG. 5 shows still another washing device 20 according to a third embodiment of the invention, which is similar to the second embodiment shown in FIG. 4 but is different therefrom in that the nozzles 25 are rotatably supported by the nozzle-supporting pipe 40 and that the nozzles 25 are so structured as to rotate around a vertical axis by the pressure of the liquid emission therefrom. The number of the nozzles 25 may be less than that in the second embodiment of the invention shown above. Indeed, there may be provided only one such rotatably supported nozzle 25 at the center of the nozzle-supporting pipe 40, this single nozzle 25 emitting liquids directly above the dispersion feeder 2 while turning around horizontally.

FIGS. 6A and 6B show still another washing device 20 according to a fourth embodiment of the invention having four support columns 22 erected on the base 15, beams (not shown) spanning the top parts of these columns 22 and vinyl sheets 50 which cover the four sides and the top of the weighing machine 1. The bottom ends of the vinyl sheets 50 are inserted over the upper surface of the chute 9 as shown in FIG. 6B such that the warm water and the cleaning liquid emitted from the nozzles 25 above are mostly received by the chute 9 except for a small portion.

The invention has been described above with reference to only a limited number of embodiments, but these embodiments are intended to be illustrative and not to limit the scope of the invention. Many modifications and variations are possible on these embodiments within the scope of the invention. For example, the nozzles for liquids need not always be installed at elevated positions inside the washing chamber 21 but they may be installed on the support columns 22 or side walls by way of suitable arm-like supporting members. As another example, there may be provided many fixed nozzles or separate nozzles for warm water and a cleaning liquid.

As a further variation, say, of the first embodiment of the invention described above, the washing device 20 which comprises a washing chamber, as described above, may be connected to a lifting device 50 as shown in FIGS. 7A and 7B such that it can be removed to a waiting position away from the weighing machine 1 during the normal mode of operation of the latter. FIGS. 7A and 7B show the lifting device 50 as comprising a plurality of ropes and pulley wheels rotatably supported from the ceiling above the weighing machine 1. The nozzles 25 (not shown in FIGS. 7A and 7B) are connected to a hose 51 which is wound around another pulley supported from the ceiling. (The connection of the hose to liquid sources is not shown in FIGS. 7A and 7B.) The conveyor 12 for dropping articles to be weighed, according to this embodiment of the invention, is also retractable as schematically shown by an arrow in FIG. 7B. FIG. 7B shows the weighing machine 1 in its normal weighing mode of operation. When it is switched to the washing mode of operation, the mobile conveyor 12 is retracted out of the way of the washing device 20, and the lifting device 50 thereafter lowers the washing device 20 to surround and cover the weighing machine 1. This embodiment of the invention is advantageous particularly in that the components used for the washing operation are not in the way of inspection and maintenance works on the weighing machine 1 because they can be completely removed away from the weighing machine 1. According to a preferable embodiment, the operations of the lifting device 50 to lift the washing device 20 when the normal mode of operation has been selected and to lower it when the washing mode of operation has been selected are automatically controlled by means of the control unit 45 (not shown in FIGS. 7A and 7B).

FIG. 8 shows a still another variation of the invention which is applicable where a plurality of weighing machines 1 are set in a row. The ceiling above the weighing machines 1 supports a rail 55 along which a mobile crane 56 can travel horizontally. The crane 56 supports a washing device 20 as described above with reference to FIGS. 7A and 7B. This variation is advantageous because a single washing device 20 can be used for operating a plurality of weighing machines 1 alternately in the washing mode.

In summary, combinational weighing machines according to the present invention are advantageous because a novel washing device is provided, or can be brought thereto and installed therearound, when operated in a washing mode such that warm water and the cleaning liquid used for the washing of the weighing machine can be prevented from scattering all over the working areas therearound.

What is claimed is:

1. In combination with a combinational weighing machine comprising a plurality of weigh hoppers for weighing articles therein, a feeder for supplying articles to said weigh hoppers and a chute for collecting articles dropped from said weigh hoppers, a washing device comprising:

means for covering all four sides and top of said combinational weighing machine to thereby form a washing chamber;

liquid-emitting nozzles inside said washing chamber;

an article receiver for receiving from said chute articles collected thereby; and a liquid receiver for receiving discharged liquid from said chute, said article and liquid receivers being supported so as to be horizontally movable.

2. In combination with a combinational weighing machine comprising a plurality of weigh hoppers for weighing articles therein, a feeder for supplying articles to said weigh hoppers and a chute for collecting articles dropped from said weigh hoppers, a washing device comprising:

means for covering all four sides and top of said combinational weighing machine to thereby form a washing chamber;

liquid-emitting nozzles inside said washing chamber; and a steam-emitting nozzle for emitting steam and causing said emitted steam to enter said washing room through said chute.

3. In combination with a combinational weighing machine comprising a plurality of weigh hoppers for weighing articles therein and a feeder for supplying articles to said weigh hoppers, a washing device comprising:

means for covering all four sides and top of said combinational weighing machine to thereby form a washing chamber;

liquid-emitting nozzles inside said washing chamber; and a lifting means for supporting from above and lifting said covering means away from said weighing machine.

4. The washing device of claim 3 further comprising means for causing said lifting means to travel horizontally.

5. The washing device of claim 3 further comprising a control means for controlling said lifting means to lift said covering means when a normal mode of operation of said weighing machine has been selected and to lower said covering means to cover said weighing machine when a washing mode of operation has been selected for said weighing machine.

6. The washing device of claim 3 wherein said washing chamber has an opening formed above said weighing machine.

7. The washing device of claim 3 wherein said liquid-emitting nozzles are rotatably supported by said covering means and adapted to rotate as a liquid is emitted therethrough.

8. The washing device of claim 3 wherein a plurality of said liquid-emitting nozzles are attached to a horizontally extended pipe which is horizontally movable over said weighing machine.

9. The washing device of claim 3 wherein said covering means includes columns and vinyl sheets supported by said columns and having lower edges thereof placed over said chute.

10. A combinational weighing machine comprising:

a plurality of weigh hoppers for weighing articles therein;

a chute for collecting articles from said weigh hoppers;

a dispersion feeder for dispersing articles to be weighed;

supply troughs for supplying articles from said dispersion feeder to said weigh hoppers;

control means for controlling overall operations of said weighing machine inclusive of combining weight values outputted from said weigh hoppers and discharging articles from selected ones of said weigh hoppers; and a washing device comprising:

means for covering all four sides and top of said dispersion feeder, said supply troughs and said weigh hoppers to thereby form a washing chamber;

liquid-emitting nozzles inside said washing chamber;

an article receiver for receiving from said chute articles collected thereby; and a liquid receiver for receiving discharged liquid from said chute, said article and liquid receivers being supported so as to be horizontally movable.

11. The combinational weighing machine of claim 10 wherein said washing chamber has an opening formed above said weighing machine.

12. The combinational weighing machine of claim 10 wherein said liquid-emitting nozzles are rotatably supported by said covering means and adapted to rotate as a liquid is emitted therethrough.

13. The combinational weighing machine of claim 10 wherein a plurality of said liquid-emitting nozzles are attached to a horizontally extended pipe which is horizontally movable over said weighing machine.

14. The combinational weighing machine of claim 10 wherein said covering means includes columns and vinyl sheets supported by said columns and having lower edges thereof placed over said chute.

15. A combinational weighing machine comprising:

a plurality of weigh hoppers for weighing articles therein;

a chute for collecting articles dropped from said weigh hoppers;

a dispersion feeder for dispersing articles to be weighed;

supply troughs for supplying articles from said dispersion feeder to said weigh hoppers;

control means for controlling overall operations of said weighing machine inclusive of combining weight values outputted from said weigh hoppers and discharging articles from selected ones of said weigh hoppers; and a washing device comprising:

means for covering all four sides and top of said dispersion feeder, said supply troughs and said weigh hoppers to thereby form a washing chamber;

liquid-emitting nozzles inside said washing chamber; and a steam-emitting nozzle for emitting steam and causing said emitted steam to enter said washing room through said chute.

16. A combinational weighing machine comprising:

a plurality of weigh hoppers for weighing articles therein;

a dispersion feeder for dispersing articles to be weighed;

supply troughs for supplying articles from said dispersion feeder to said weigh hoppers;

control means for controlling overall operations of said weighing machine inclusive of combining weight values outputted from said weigh hoppers and discharging articles from selected ones of said weigh hoppers;

a washing device comprising means for covering all four sides and top of said dispersion feeder, said supply troughs and said weigh hoppers to thereby form a washing chamber, and liquid-emitting nozzles inside said washing chamber; and a lifting means for supporting from above and lifting said covering means away from said weighing machine.

17. The combinational weighing machine of claim 16 further comprising means for causing said lifting means to travel horizontally.

18. The combinational weighing machine of claim 16 wherein said control means further serves to control said lifting means to lift said covering means when a normal mode of operation of said weighing machine has been selected therethrough and to lower said covering means to cover said weighing machine when a washing mode of operation has been selected therethrough for said weighing machine.

* * * * *

UNITED STATES PATENT AND TRADEMARK OFFICE
CERTIFICATE OF CORRECTION

PATENT NO. : 5,621,194
DATED : April 15, 1997
INVENTOR(S) : Koyama et al.

It is certified that error appears in the above-indentified patent and that said Letters Patent is hereby corrected as shown below:

On the title page, item [54] and col. 1, lines 1-2 replace:

"COMBINATIONAL WEIGHING MAHINE WITH WASHING DEVICE"

with
--COMBINATIONAL WEIGHING MACHINE WITH WASHING DEVICE--

Signed and Sealed this

Twelfth Day of August, 1997

Attest:

BRUCE LEHMAN

Attesting Officer

Commissioner of Patents and Trademarks